United States Patent
Stephan et al.

(10) Patent No.: US 10,088,201 B2
(45) Date of Patent: Oct. 2, 2018

(54) SUPPORT ASSEMBLIES FOR SOLAR ENERGY PANELS

(71) Applicant: PEGASUS SOLAR INC., Richmond, CA (US)

(72) Inventors: Erich Kai Stephan, Newport Beach, CA (US); Glenn Harris, Sausalito, CA (US)

(73) Assignee: PEGASUS SOLAR INC., Richmond, CA (US)

( * ) Notice: Subject to any disclaimer, the term of this patent is extended or adjusted under 35 U.S.C. 154(b) by 0 days.

(21) Appl. No.: 15/287,267

(22) Filed: Oct. 6, 2016

(65) Prior Publication Data

US 2017/0102167 A1    Apr. 13, 2017

Related U.S. Application Data

(60) Provisional application No. 62/239,698, filed on Oct. 9, 2015.

(51) Int. Cl.
| | |
|---|---|
| *F24S 25/636* | (2018.01) |
| *F24S 80/00* | (2018.01) |
| *H02S 20/23* | (2014.01) |
| *F24S 25/61* | (2018.01) |
| *F24S 25/70* | (2018.01) |
| *F24S 25/60* | (2018.01) |

(52) U.S. Cl.
CPC .............. *F24S 25/636* (2018.05); *F24S 25/61* (2018.05); *F24S 25/70* (2018.05); *F24S 80/00* (2018.05); *H02S 20/23* (2014.12); *F24S 2025/6003* (2018.05); *F24S 2025/6006* (2018.05); *Y02B 10/12* (2013.01); *Y02E 10/47* (2013.01)

(58) Field of Classification Search
CPC ........ F24J 2/5245; F24J 2/5254; F24J 2/5258; F24J 2/5256; H02S 20/23; F24S 25/70; F24S 25/636; F24S 2025/6006; F24S 2025/6003
See application file for complete search history.

(56) References Cited

U.S. PATENT DOCUMENTS

| | | |
|---|---|---|
| 5,603,187 A | 2/1997 | Merrin et al. |
| 5,746,029 A | 5/1998 | Ullman |
| 6,360,491 B1 | 3/2002 | Ullman |
| 7,406,800 B2 | 8/2008 | Cinnamon et al. |
| 7,592,537 B1 | 9/2009 | West |

(Continued)

FOREIGN PATENT DOCUMENTS

| | | |
|---|---|---|
| CN | 103107220 | 5/2013 |
| DE | 20 2010 00480 | 8/2010 |

(Continued)

OTHER PUBLICATIONS

International Search Report and Written Opinion for PCT/US2015/023339, dated Jul. 2, 2015, 9 pages.

(Continued)

*Primary Examiner* — Eret C McNichols
(74) *Attorney, Agent, or Firm* — Polsinelli LLP

(57) ABSTRACT

Solar panel mounting assemblies having an arm support assembly for supporting a clamp assembly above an installation surface through a base and a base stud and configured to allow the clamp assembly to be adjusted in three dimensions while installing a solar panel module.

17 Claims, 11 Drawing Sheets

(56) References Cited

U.S. PATENT DOCUMENTS

| | | | |
|---|---|---|---|
| 7,762,027 B1 | 7/2010 | Wentworth et al. | |
| 7,832,157 B2 | 11/2010 | Cinnamon | |
| 7,861,485 B1 | 1/2011 | Wentworth et al. | |
| 7,866,098 B2 | 1/2011 | Cinnamon | |
| 7,895,808 B1 | 3/2011 | Wentworth et al. | |
| 7,905,064 B1 | 3/2011 | Wentworth et al. | |
| 7,987,641 B2 | 8/2011 | Cinnamon | |
| 8,092,129 B2 | 1/2012 | Wiley et al. | |
| 8,109,048 B2 | 2/2012 | West et al. | |
| 8,153,700 B2 | 4/2012 | Stearns et al. | |
| 8,166,713 B2 | 5/2012 | Stearns et al. | |
| 8,353,650 B2 | 1/2013 | Wiley et al. | |
| 8,375,654 B1 | 2/2013 | West et al. | |
| 8,505,248 B1 | 8/2013 | Leong et al. | |
| 8,505,864 B1 | 8/2013 | Taylor et al. | |
| 8,608,418 B2 | 12/2013 | Wiley et al. | |
| 8,740,163 B1* | 6/2014 | Taylor | F24J 2/5258 248/226.12 |
| 8,756,881 B2 | 6/2014 | West et al. | |
| 8,813,460 B2 | 8/2014 | Cinnamon et al. | |
| 8,875,455 B1 | 11/2014 | Yang et al. | |
| 9,057,545 B2* | 6/2015 | Stapleton | F24J 2/5249 |
| 9,171,980 B2 | 10/2015 | Chiu | |
| 9,431,953 B2* | 8/2016 | Stearns | H02S 20/23 |
| 9,473,066 B2 | 10/2016 | Stephan et al. | |
| 9,484,853 B2* | 11/2016 | Stapleton | H02S 20/23 |
| 9,496,820 B2* | 11/2016 | Seery | H02S 20/23 |
| 9,647,433 B2* | 5/2017 | Meine | H02S 40/36 |
| 9,755,571 B2* | 9/2017 | Almy | H02S 20/23 |
| 2010/0275975 A1* | 11/2010 | Monschke | F24J 2/5207 136/251 |
| 2010/0276558 A1 | 11/2010 | Faust et al. | |
| 2010/0307074 A1 | 12/2010 | Stearns et al. | |
| 2011/0000544 A1 | 1/2011 | West | |
| 2011/0001030 A1 | 1/2011 | Hochreiter et al. | |
| 2011/0100434 A1 | 5/2011 | Van Walraven | |
| 2011/0126881 A1 | 6/2011 | Hong et al. | |
| 2011/0174947 A1 | 7/2011 | Wu | |
| 2011/0214365 A1 | 9/2011 | Aftanas | |
| 2013/0008102 A1 | 1/2013 | Bindschedler et al. | |
| 2013/0011187 A1 | 1/2013 | Schuit et al. | |
| 2013/0048815 A1 | 2/2013 | Wagner et al. | |
| 2013/0291479 A1 | 11/2013 | Schaefer et al. | |
| 2013/0340358 A1 | 12/2013 | Danning | |
| 2014/0041706 A1 | 2/2014 | Haddock et al. | |
| 2014/0042286 A1 | 2/2014 | Jaffari | |
| 2014/0110543 A1* | 4/2014 | Aliabadi | H02S 20/23 248/201 |
| 2014/0169909 A1 | 6/2014 | Wiley et al. | |
| 2015/0129517 A1* | 5/2015 | Wildes | F24J 2/5245 211/41.1 |
| 2015/0249423 A1 | 9/2015 | Braunstein et al. | |
| 2015/0288320 A1 | 10/2015 | Stearns et al. | |
| 2016/0142006 A1* | 5/2016 | Meine | F24J 2/5245 174/535 |
| 2016/0268958 A1* | 9/2016 | Wildes | H02S 20/23 |
| 2017/0093327 A1* | 3/2017 | Stephan | H02S 20/23 |

FOREIGN PATENT DOCUMENTS

| | | | |
|---|---|---|---|
| EP | 2363892 | 9/2011 | |
| WO | WO 2014/028431 | 2/2014 | |
| WO | WO-2016123452 A3 * | 10/2016 | F24J 2/5245 |

OTHER PUBLICATIONS

International Search Report and Written Opinion for PCT/US2016/056122, dated Dec. 15, 2016, 9 pages.

Machine generated English translation of the first Office Action and search report for Chinese Patent Application No. 201580016267.2, dated Oct. 27, 2017, 5 pages.

Extended European Search Report for EP Application No. 15772702.5, dated Nov. 7, 2017, 7 pages.

* cited by examiner

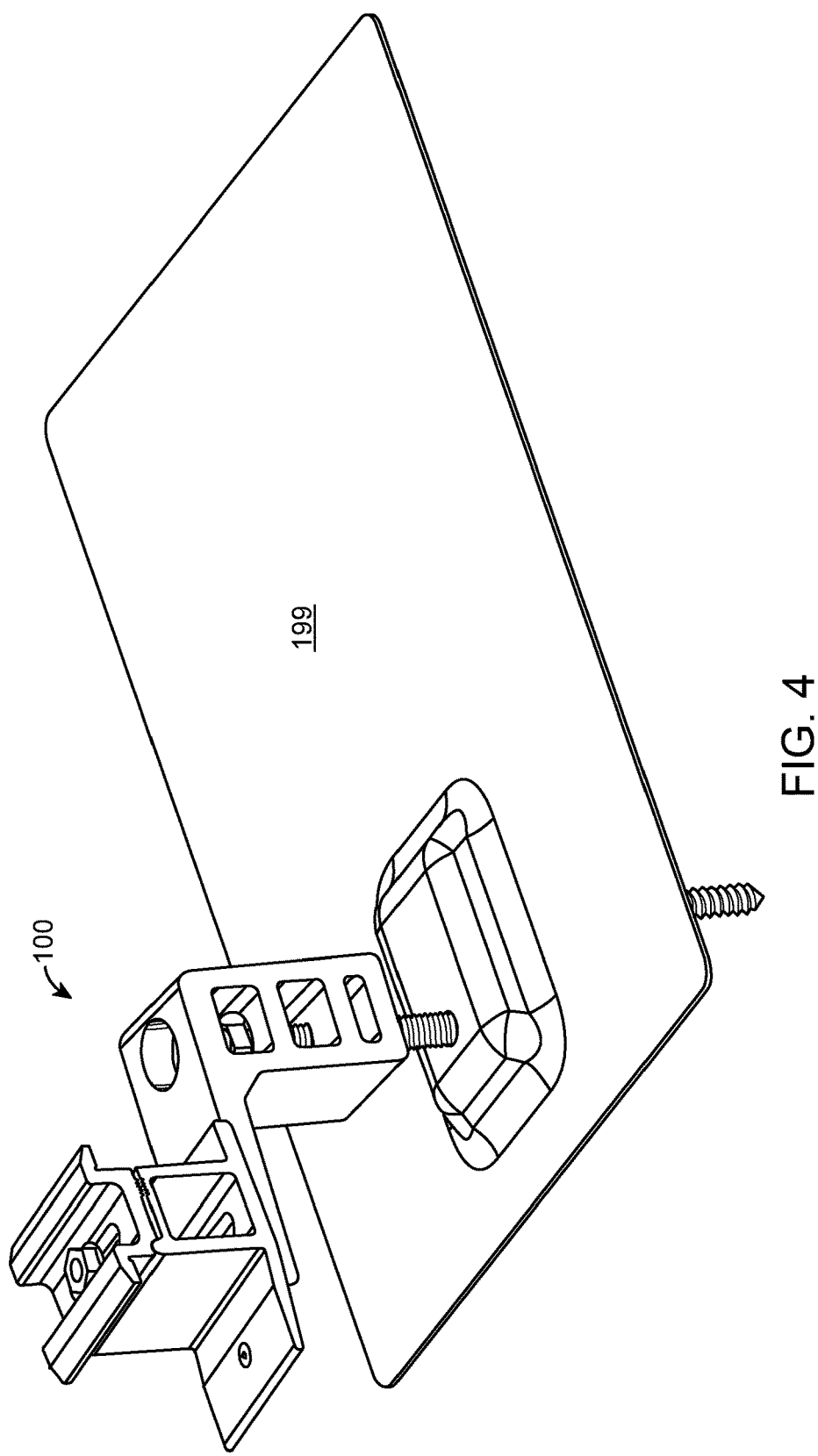

SUPPORT ASSEMBLIES FOR SOLAR ENERGY PANELS

CROSS-REFERENCE TO RELATED APPLICATIONS

The present application is claiming priority of U.S. Provisional Patent Application Ser. No. 62/239,698, filed on Oct. 9, 2015, the content of which is herein incorporated by reference.

TECHNICAL FIELD

The present technology pertains to support assemblies for mounting solar energy panels.

BACKGROUND

As solar energy becomes more economical to produce electricity for direct consumption, more solar energy systems are being installed on rooftops. Typically, components of the solar energy systems such as solar panels are installed using conventional mounting structures. However, conventional mounting structures typically require precise dimensions and can result in excessive material and extensive installation time.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Some embodiments of the present technology involve a solar panel mounting assembly having an arm support assembly for supporting a clamp assembly above an installation surface through a base and a base stud. The arm support assembly can include a top aperture, a vertical cavity, and a threaded cavity aperture. The top aperture has a clearance for accommodating a flanged end of the base stud and a socket for tightening the threaded base stud onto the base. The threaded cavity aperture has a clearance resisting a flanged end of the threaded base stud. When installed, the arm support assembly can be vertically adjusted on the base stud by rotating the threaded cavity aperture around the base stud.

In some embodiments, the base stud is a threaded rod without a flanged or hex end. In such embodiments, the base stud can be installed in the base first, e.g. in a factory setting. The mounting assembly may be threaded onto the base stud in either a factory setting or in the field by the end user.

The clamp assembly can include a clamp slot for accepting a clamping fastener that, when tightened, compresses to clamp a solar panel module. Also the arm of the arm support assembly and the clamping assembly include slots for allowing the clamping accessory to move relative to the clamping fastener and through the slot for adjusting the clamping assembly in all dimensions of a plane while installing the solar panel module.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an isometric view of a mounting assembly installed on an installation surface according to some embodiments of the present technology;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As explained above, conventional solar panel mounting structures require precise dimensions and can result in excessive material and extensive installation time. Accordingly, the present technology involves support assemblies for supporting solar panel modules and solar panel mounting assemblies.

Some embodiments of the present technology involve solar panel mounting assemblies that support solar panel mounting clamps in a wide variety of positions. In some embodiments, the mounting assemblies can position the clamps at various positions in three dimensions that significantly facilitates installation of the solar panels onto a installation surface.

Figure 1:
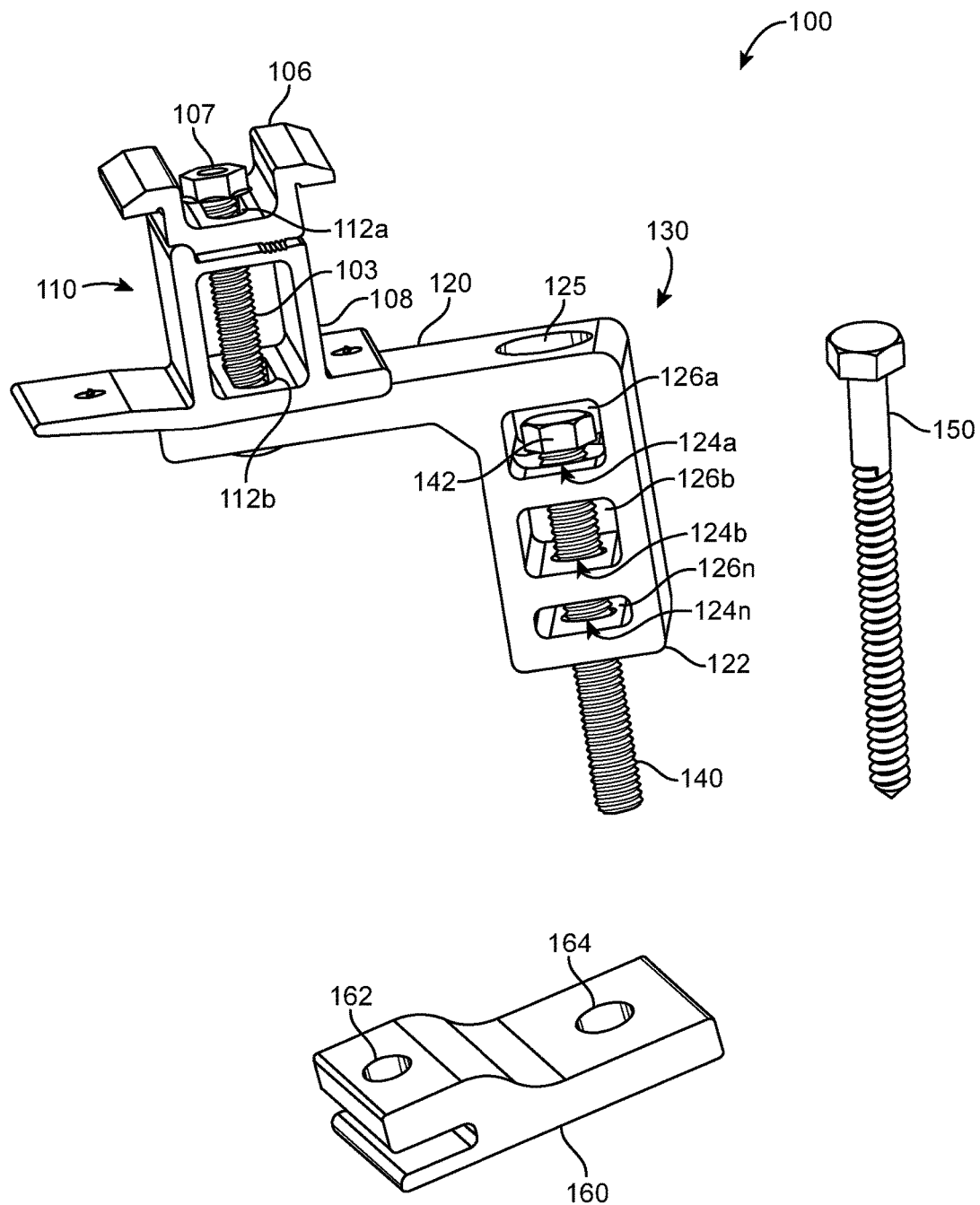
FIG. 1 illustrates a solar panel mounting assembly according to some embodiments of the present technology.

FIG. 1 illustrates a solar panel mounting assembly 100 according to some embodiments of the present technology. The solar panel mounting assembly 100 includes an arm support assembly 130 that includes a support body 122 and a mounting arm 120. The support body 122 includes a top aperture 125 and one or more cavities $126_a$, $126_b$, ..., $126_n$. The cavities $126_a$, $126_b$, ..., $126_n$ include cavity apertures $124_a$, $124_b$, . . . , $124_n$. Also, the cavity apertures $124_b$, . . . , $124_n$ can be threaded such that a threaded base stud 140 can be inserted through the top aperture 125 and thread through the cavity apertures $124_b$, . . . , $124_n$.

The mounting assembly 100 also includes a base 160 that can be mounted to an installation surface by a surface fastener 150 through a surface fastener aperture 164. The base 160 also includes a threaded base stud aperture 162 for accepting the base stud 140. In some embodiments, the top aperture 125 is configured with a clearance wide enough to accommodate the base stud 140 with a flanged end and a socket (not shown) for rotating the base stud 140 into the base stud aperture 162. The clearance of the top aperture 125 also allows the base stud's 140 head 142 to remain below the top surface of the support body 122 to prevent the base stud 140 from interfering with the solar panel installation. In some embodiments, the mounting arm 120 has ribs or grooves used to hold a string or as a sight to ensure multiple mounting arms 120 are level with one another when multiple are installed.

The mounting assembly 100 also includes a clamp assembly 110 for securing a solar panel module (not shown) to the mounting assembly 100. The clamp assembly 110 includes a bottom clamp 108 and a top clamp 106 which, when compressed together, secure a solar panel module (not shown) in position. The top clamp 106 and the bottom clamp 108 include apertures 112a, 112b, respectively, for allowing a fastener to be inserted therethrough. Likewise, the mounting arm 120 of the arm support assembly 130 includes an aperture (not shown) for allowing the fastener 103 to be inserted through the mounting arm 120. The mounting arm aperture is configured such that a flanged end 104 of the fastener 103 cannot pass through such that when a nut 107 is tightened on the fastener 103, the top clamp 106 is compressed onto the bottom clamp 108.

In some embodiments of the present technology, the apertures 112a, 112b, and the mounting arm aperture (not shown) are configured as slots such that the fastener can traverse the slot, thereby allowing the position of the clamp assembly to be adjusted during installation.

When the base stud 140 is tightened into the base 160, the arm support assembly 130 can be rotated (e.g. threaded) on the base stud 140, allowing the height of the arm support assembly 130 and the clamp assembly 110, relative to the installation surface, to be adjusted during installation. Also, the base stud's 140 head 142 can be flanged such that the cavity aperture $124_b$ prevents the arm support assembly 130 to be rotated off the base stud 140 after the base stud 140 is tightened into the base 160.

Figure 2:
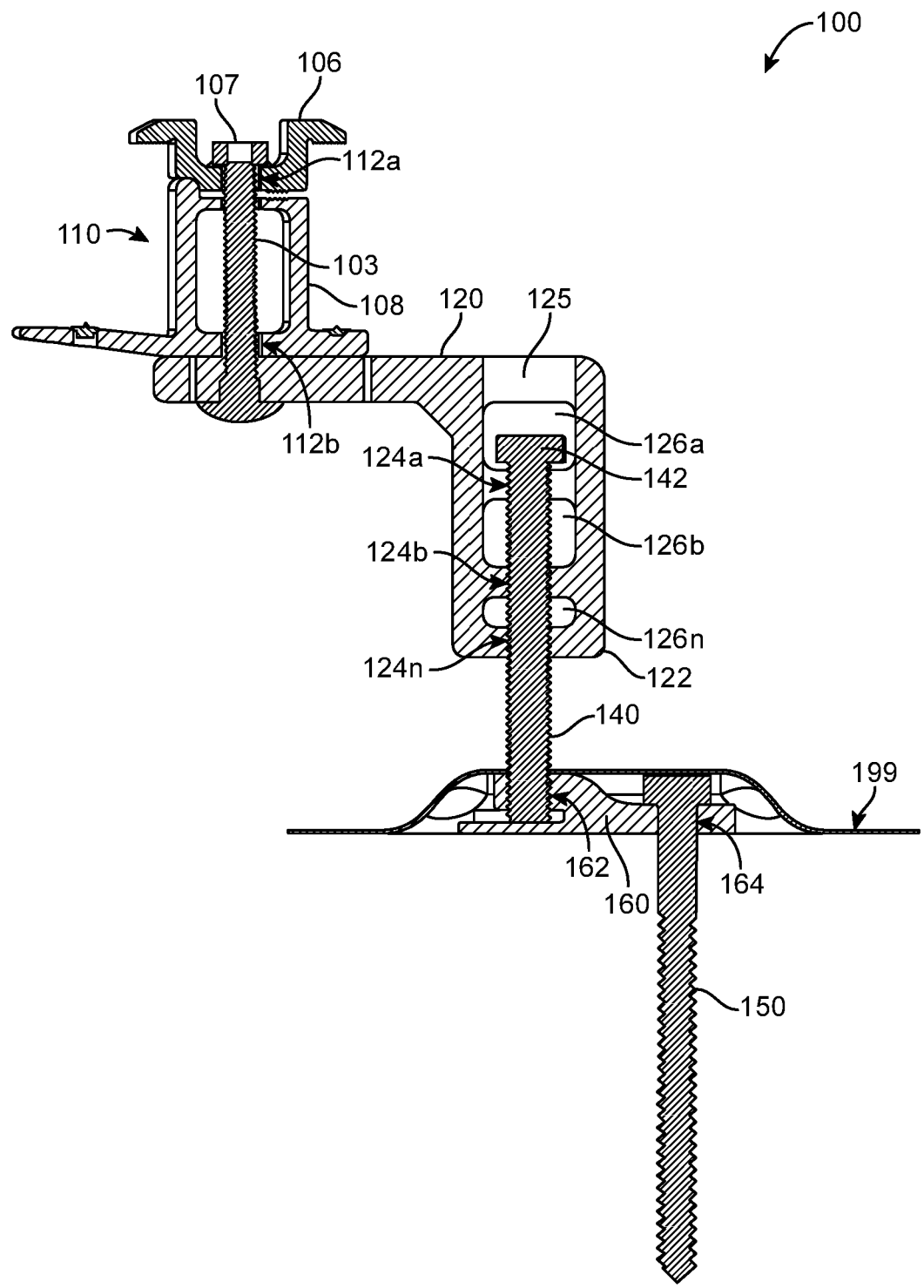
FIG. 2 illustrates a side view of a mounting assembly secured to an installation surface according to some embodiments of the present technology.

FIG. 2 illustrates a side view of a mounting assembly 100 secured to an installation surface 199 according to some embodiments of the present technology. As shown, the surface fastener 150 secures the base 160 to the installation surface 199 and a flashing 170 covers the base 160 and surface fastener 150. Also, the base stud 140 is positioned in the support body 122 through the top aperture 125 and threaded through the cavity apertures $124_a$, $124_b$, . . . , $124_n$. The top aperture 125 has a clearance large enough to allow the flanged end 142 of the base stud 140 and a socket for rotating the flanged end 142 of the base stud; however, the cavity aperture 124b has a clearance that prevents the support body 122 from being rotated off the base stud 140 in an upward direction.

The base stud 140 is threaded into the base 160 and supports the arm support assembly 130 and the clamp assembly 110 over the installation surface. Once the mounting assembly 100 is assembled, the arm support assembly 130 can be rotated around the base stud 140 to adjust the height of the clamp assembly 110 relative to the installation surface 199.

The base stud 140 and the surface fastener 150 can be removed and repositioned after the clamp assembly 110 is installed onto a solar panel.

Figure 3A:
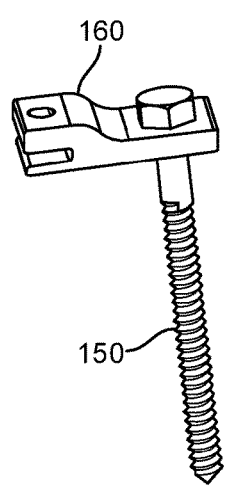
FIGS. 3A-3D illustrate views of a mounting assembly being assembled and the clamp assembly being adjusted in three dimensions according to some embodiments of the present technology.
Figure 3B:
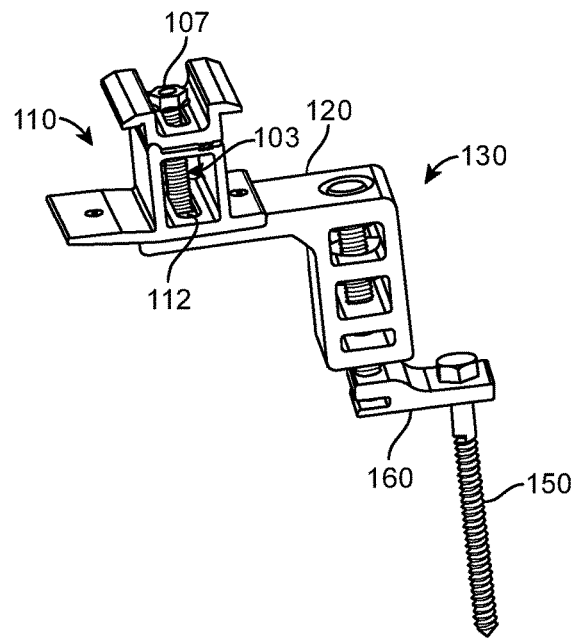

FIGS. 3A-3D illustrate views of a mounting assembly 100 being assembled and the clamp assembly 110 being adjusted in three dimensions according to some embodiments of the present technology. In FIG. 3A, the surface fastener 150 is threaded through the surface fastener aperture 164 of the base 160. Next, in FIG. 3B, a flashing 170 (not shown) may be installed over the base 160 and surface fastener 150, and then the support arm assembly 130 is coupled with the base 160 with the base stud 140 with the clamp assembly 110 loosely attached to the mounting arm 120 by the fastener 103 being loosely tightened with the nut 107 through the slot 112.

Figure 3C:
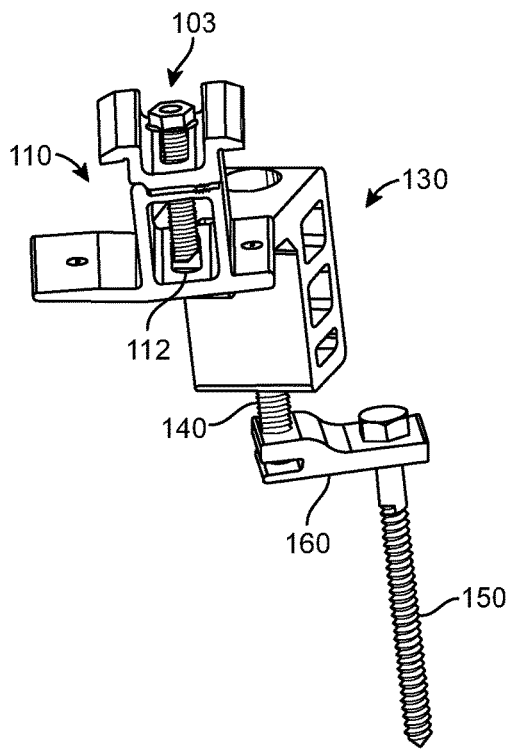
Figure 3D:
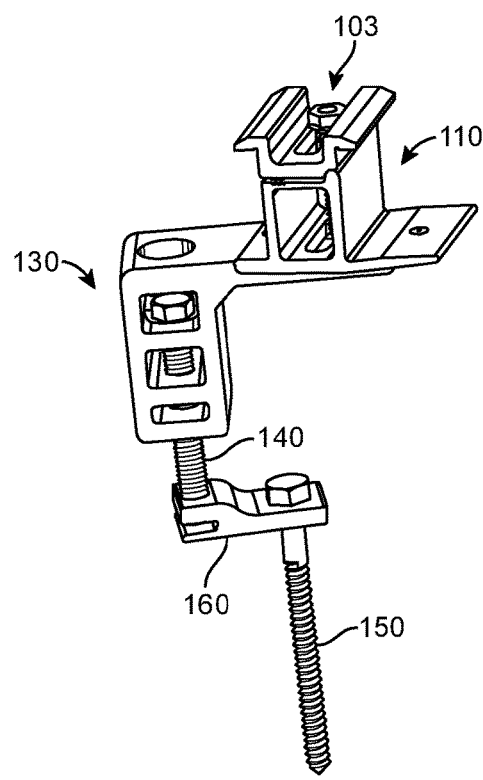

FIGS. 3C and 3D illustrate the arm support assembly 130 being rotated on the base stud 140 to adjust the height of the clamp assembly 110 and the clamp assembly 110 being adjusted in in the dimensions of a plane by rotating relative to the mounting arm 120 around the fastener 103 and through the slot 112.

FIG. 4 illustrates an isometric view of a mounting assembly 100 installed on an installation surface 199 according to some embodiments of the present technology.

Figure 5A:
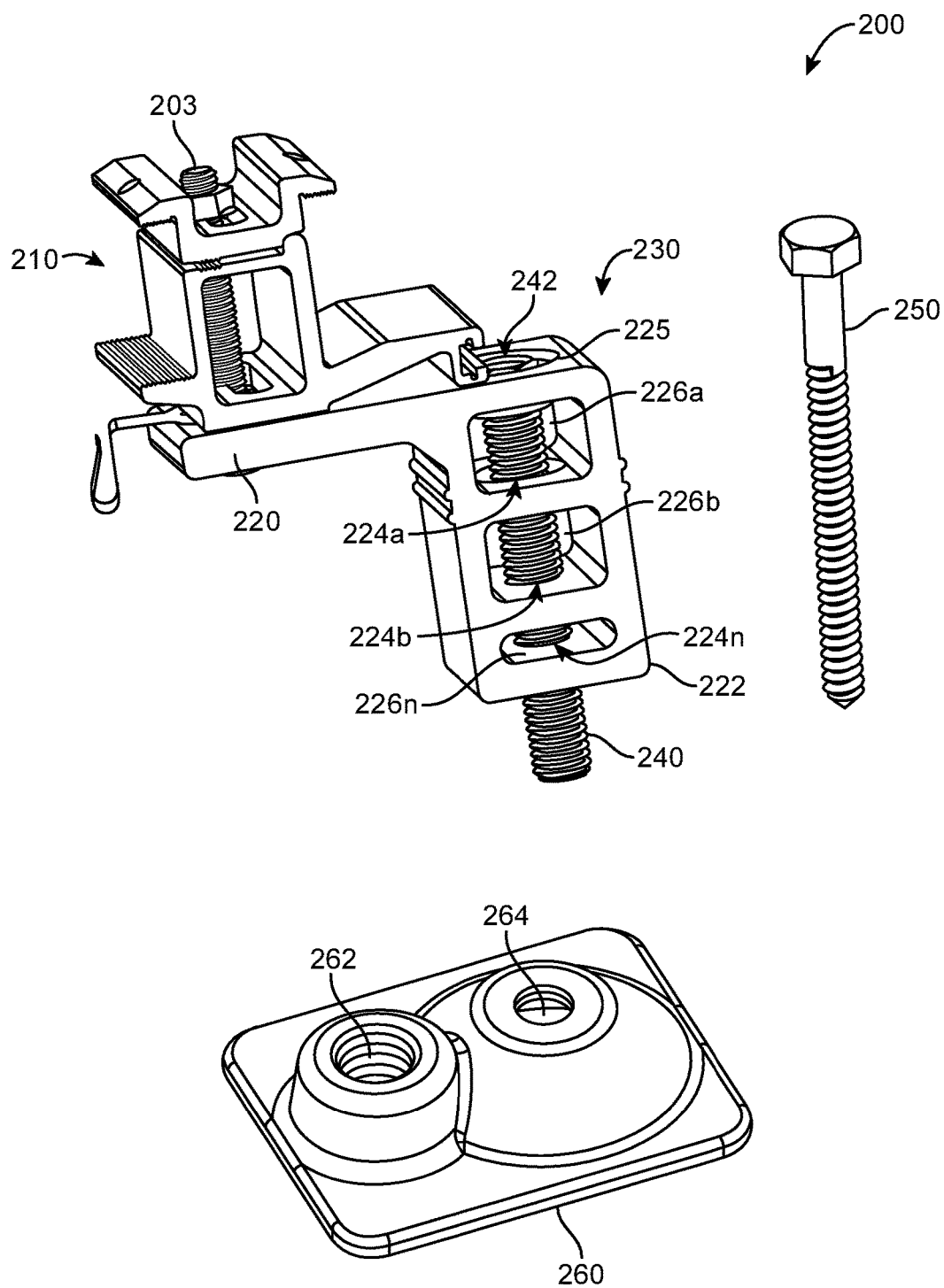
FIGS. 5A and 5B illustrate a solar panel mounting assembly according to some embodiments of the present technology.
Figure 5B:
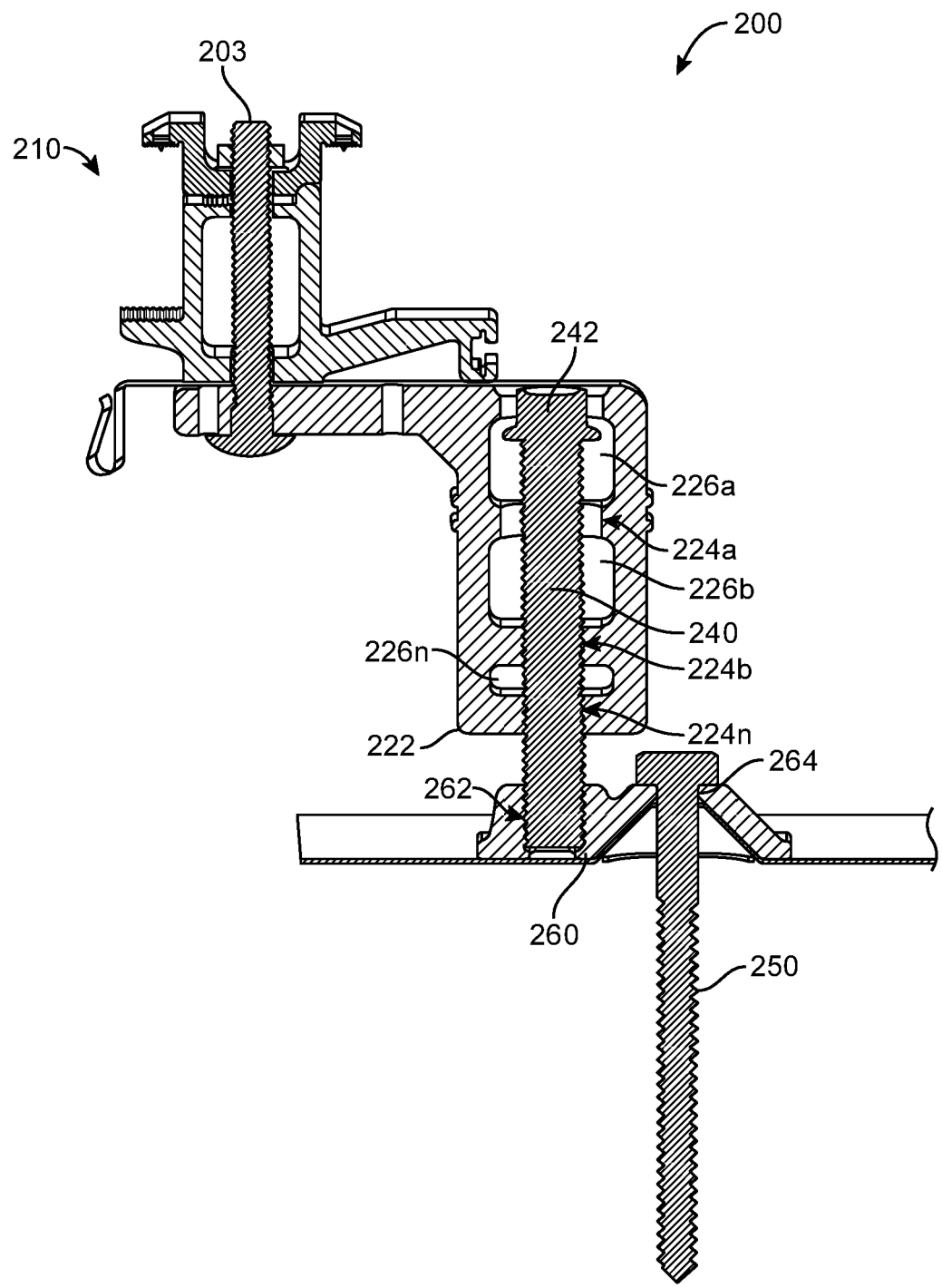

FIGS. 5A and 5B illustrate a solar panel mounting assembly 200 according to some embodiments of the present technology. The solar panel mounting assembly 200 includes an arm support assembly 230 that includes a support body 222 and a mounting arm 220. The support body 222 includes a top aperture 225 and one or more cavities $226_a$, $226_b$, . . . , $226_n$. The cavity $226_a$ has a cavity aperture $224_a$ that has a clearance large enough to allow the flanged end 242 of the base stud 240 and a socket through the cavity aperture $224_a$ for allowing the base stud to be fastened to a threaded base stud aperture 262 on the base 260. Cavities $226_b$, . . . , $226_n$ include threaded cavity apertures $224_b$, . . . , $224_n$ for threading the base stud 240 into the support body 222.

The mounting assembly 200 also includes a clamp assembly 210 for securing a solar panel module (not shown) to the mounting assembly 200. The clamp assembly 210 includes a slot 212 and the mounting arm 220 includes an additional slot for allowing the fastener 203 to be inserted through the clamp assembly 210 and the mounting arm 220 and compress the clamp assembly 210.

The base 260 can also include a flashing 270 having a conical shape that protrudes vertically and nests within a cavity in the underside of base 260. Surface fastener 250 attaches base 260 to installation surface 299. The base stud 240 threadably secures to base 260 and the threaded hole in base 260 may not be threaded completely through, thereby preventing the base stud 240 from protruding below the bottom of base 260 when base stud 240 is fully installed. In these embodiments, the surface fastener 250 is accessible after the flashing 270 and support arm assembly 230 is installed, thereby allowing a removal of the surface fastener 250 and repositioning of the entire base, flashing, and mounting assembly without disassembling those components.

When the clamp assembly 210 is loosely coupled with the mounting arm 220, the arm support assembly 230 is coupled with the base 260, and the base is secured to an installation surface 299, the clamp assembly 210 can be adjusted in three dimensions by rotating the clamp assembly around the fastener 203 and through the slot 212 and by rotating thereby threadably engaging the arm support assembly around the base stud 240.

Figure 6A:
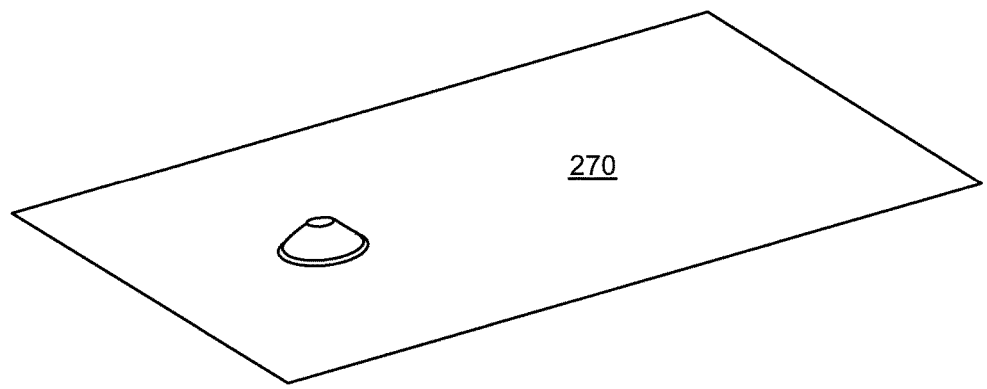
FIGS. 6A-6D illustrate views of a mounting assembly being assembled and the clamp assembly being adjusted in three dimensions according to some embodiments of the present technology.
Figure 6B:
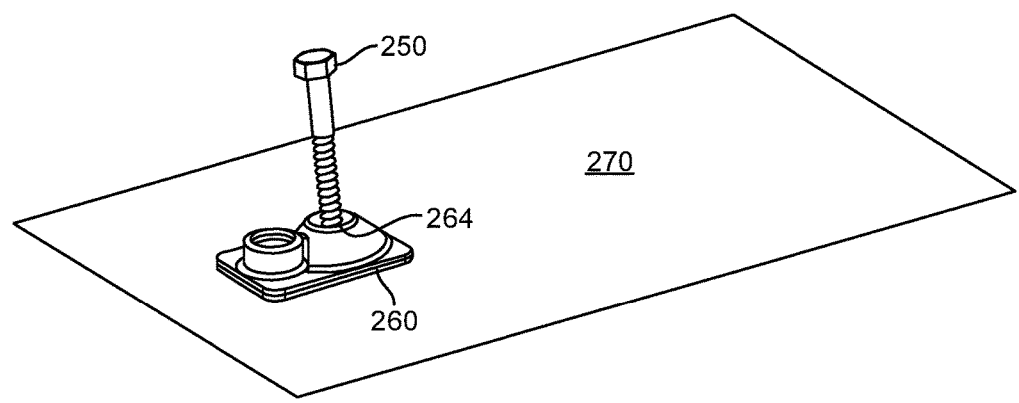
Figure 6C:
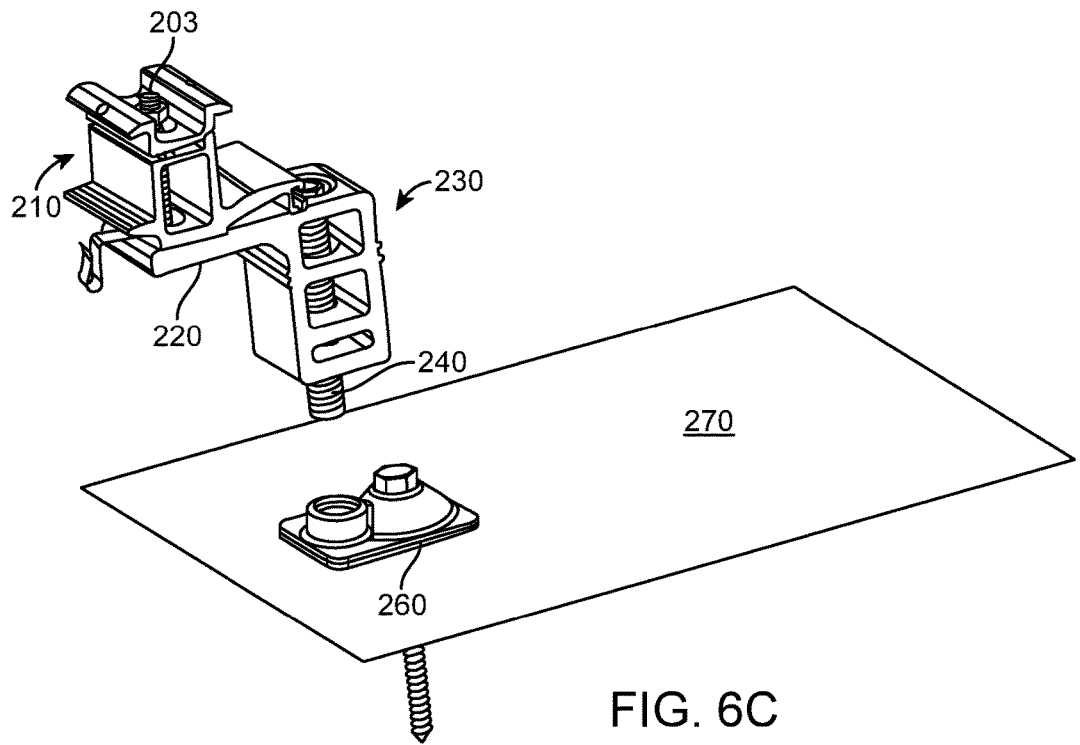
Figure 6D:
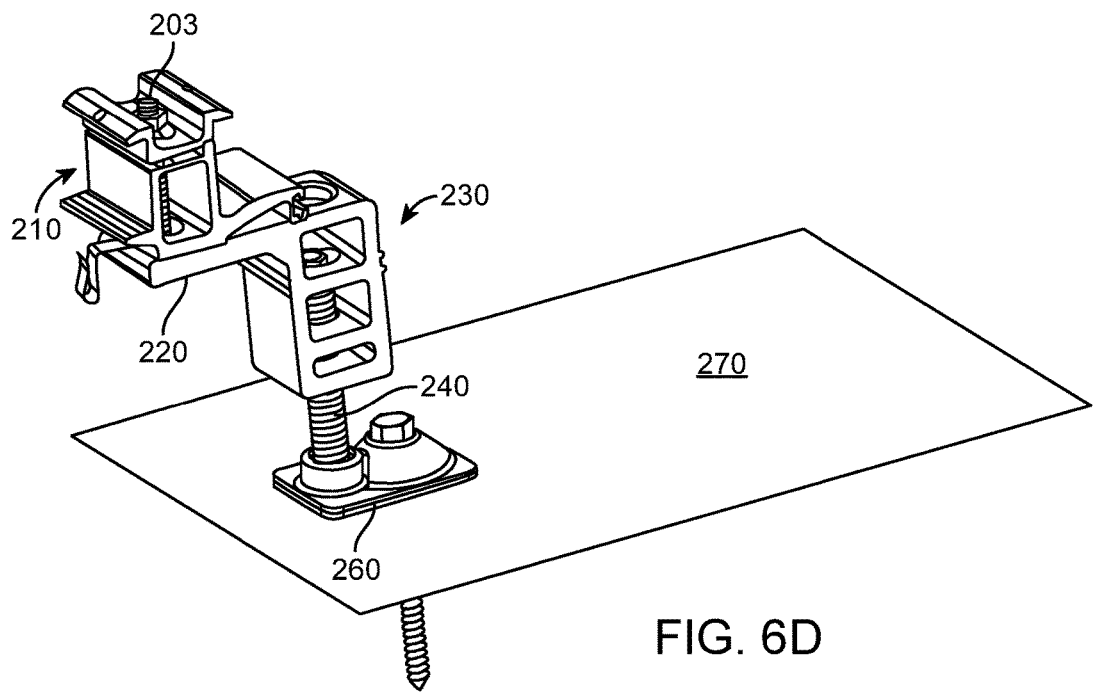

FIGS. 6A-6D illustrate views of a mounting assembly 200 being assembled and the clamp assembly 210 being adjusted in three dimensions according to some embodiments of the present technology. In FIG. 6A, a flashing 270 is placed on an installation surface and in FIG. 6B, a surface fastener 250 is threaded through the surface fastener aperture 264 of the base 260. Next, in FIG. 6C, the clamp assembly 210 is loosely attached to the mounting arm 220 by the fastener 203. In FIG. 6D the support arm assembly 230 in coupled with the base 260 with the base stud 240.

Figure 7A:
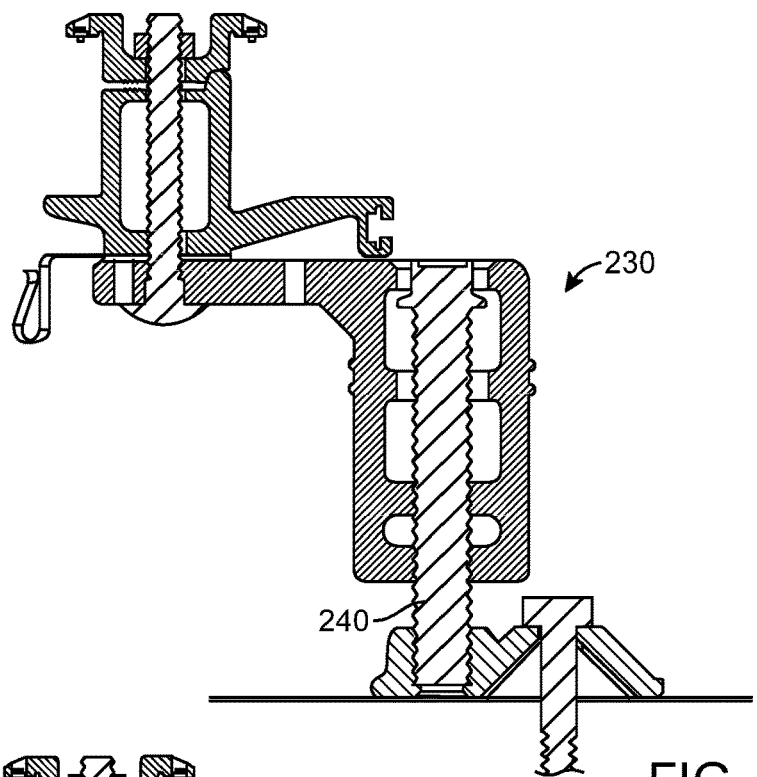
FIGS. 7A and 7B illustrate the arm support assembly being rotated on the base stud to adjust the height of the clamp assembly according to some embodiments of the present technology.
Figure 7B:
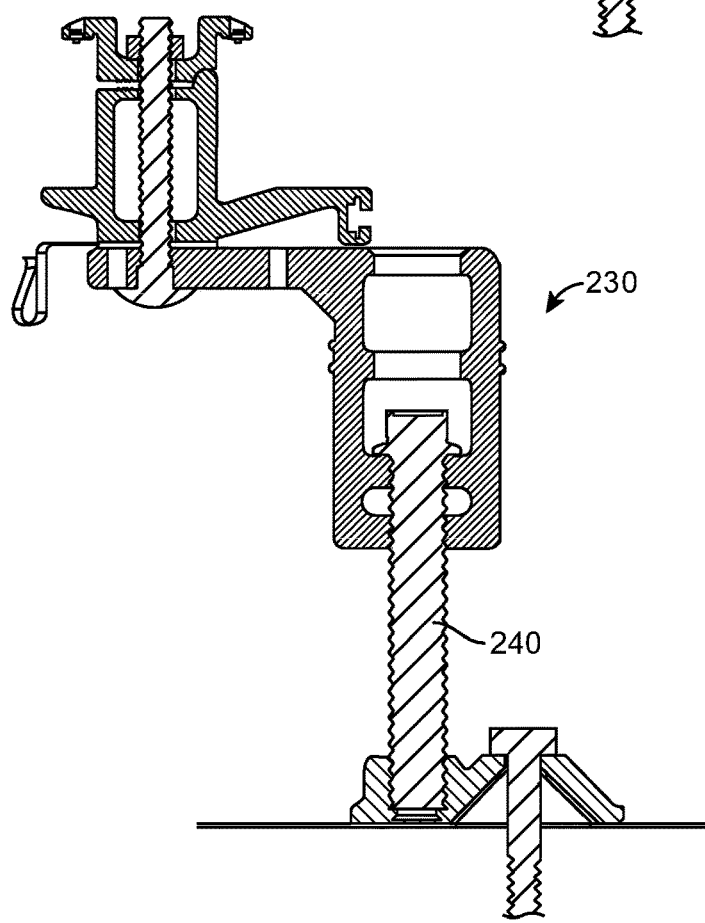

FIGS. 7A and 7B illustrate the arm support assembly 230 being rotated on the base stud 240 to adjust the height of the clamp assembly according to some embodiments of the present technology.

Figure 8:
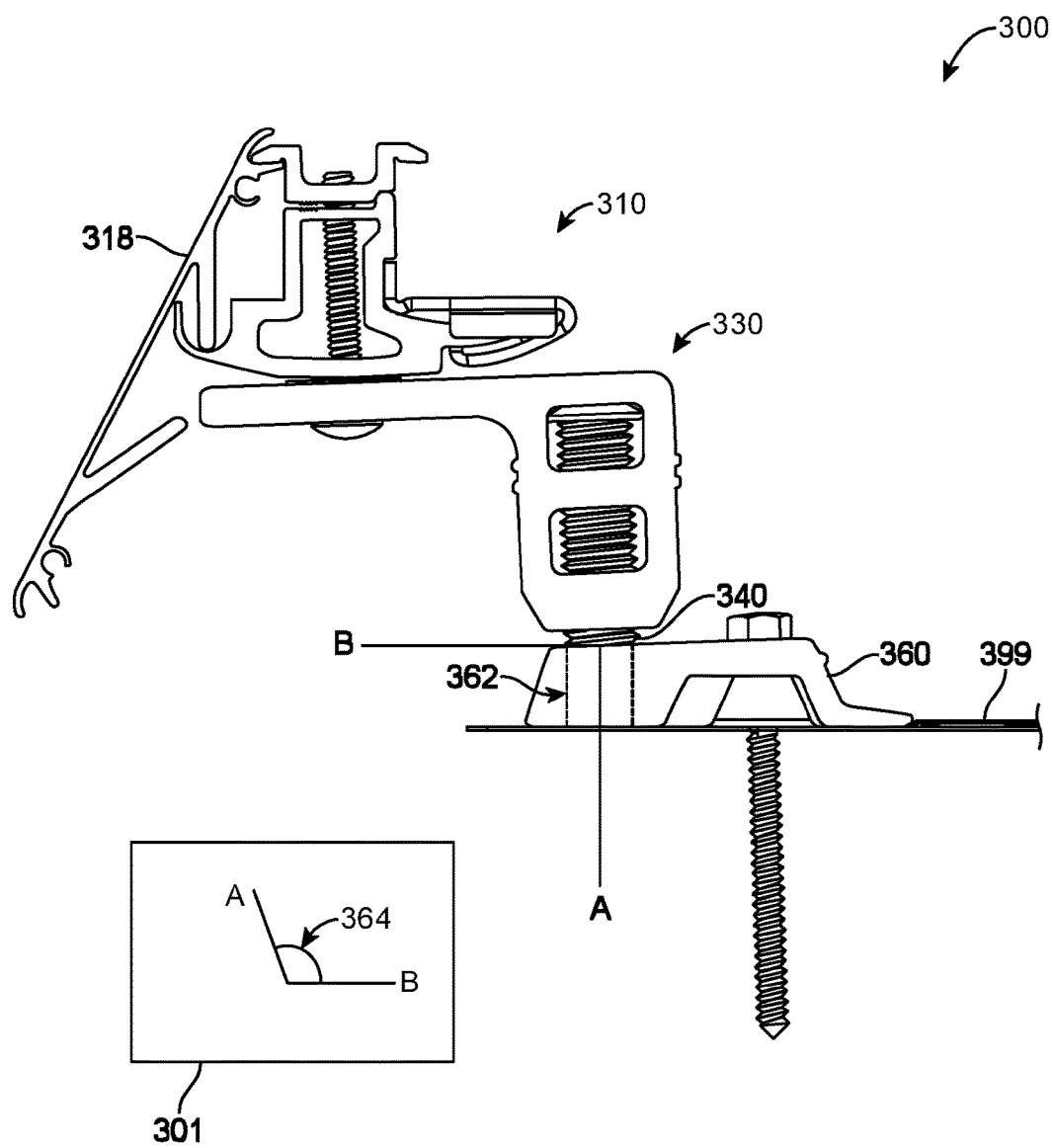
FIG. 8 illustrates a solar panel mounting assembly according to some embodiments of the present technology.

FIG. 8 illustrates a solar panel mounting assembly 300 according to some embodiments of the present technology. The mounting assembly 300 includes a clamp assembly 310 secured above an installation surface 399 through an arm support assembly 330, a base stud 340, base 360 and fastener 350.

As shown in FIG. 8, the base 360 has a base stud aperture 362 that is bored at an angle relative to the bottom surface of the base 360 (as shown in detail 301 with axis B being parallel with the surface of the base, axis A being parallel with the direction of the base stud aperture 362, and angle 364 between axis A and axis B).

The angled base stud aperture 362 addresses a slight angle that would otherwise be created between the base stud and the installation surface 399 caused by the base 360 sitting on overlapping shingles on an installation surface and the installation surface being at a slight angle relative to the actual installation surface. Building in the angle 364 in the base stud 360 relative to the bottom surface of the base compensates for this angle created by the shingles. Accordingly, the angle 364 can be configured in a wide variety of ways (acute, obtuse, etc.) to accommodate a wide variety of installation scenarios. Additionally, the clamp assembly 310 can also be configured with additional clamping surfaces to hold one or more accessories (e.g. a wind skirt 318).

Figure 9A:
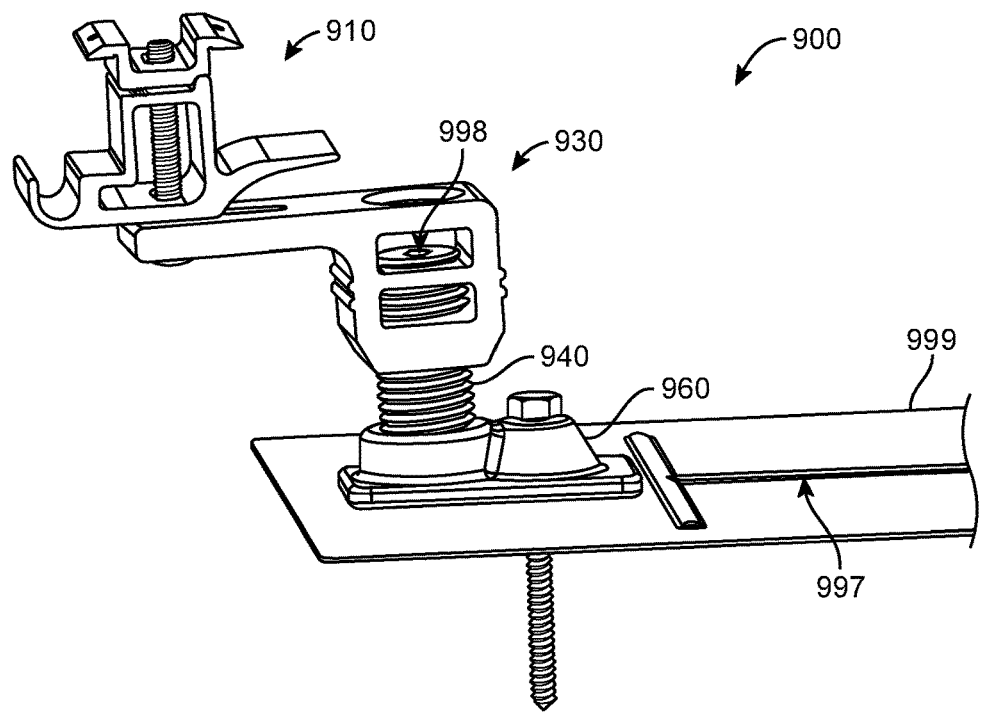
FIGS. 9A-9B illustrate a solar panel mounting assembly according to some embodiments of the present technology.
Figure 9B:
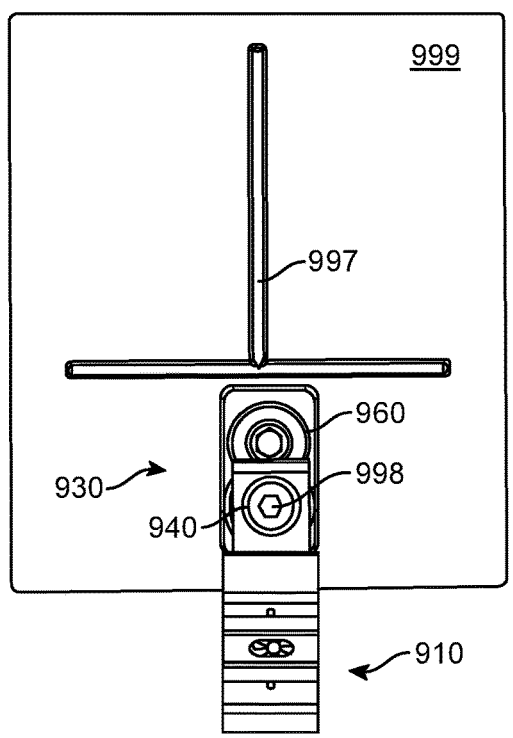

FIGS. 9A-9B illustrate a solar panel mounting assembly 900 according to some embodiments of the present technology. As shown in FIGS. 9A-9B, a solar panel mounting assembly 900 includes a clamp assembly 910 secured above a flashing 999 though an arm support assembly 930, a base stud 940, base 960 and fastener 950.

The base stud 940 can be a threaded rod with a drive feature 998 extruded therein that is accessible from the top of the arm support assembly 930. The flashing 999 can also include an embossment to increase rigidity. As the base 960 is compressed onto the flashing 999 by using the fastener 950, the embossment 997 reduces flashing 999 from flaring up on the lateral edges. The drive feature 998 is sized to accommodate a common driver tool that is used to hold a socket that drives fastener 950. In some orientations of the solar panel mount assembly 900 the drivable feature 998 will be accessible from the top. In these instances, the drivable feature 998 can be engaged after one or more solar energy panels are installed into clamp assembly 910, and thus the entire solar panel mounting assembly 900 can be removed from base 960 by unthreading base stud 940 from base 960. Upon ensuring the solar energy panels are at the correct height above the roof, the base stud 940 can be threadably engaged with base 960 using drive feature 998 to secure solar panel mount assembly 900 to the base 960.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A solar panel mounting assembly comprising:
    a solar panel arm support assembly comprising:
        a support body comprising a top aperture on a top of the support body, a vertical cavity, and a threaded cavity aperture;
        a mounting arm substantially orthogonal to the support body, the mounting arm including an arm slot;
        a threaded base stud; and
        wherein the mounting arm extends from the top of the support body and substantially orthogonal to the support body, wherein the top aperture, the vertical cavity and the threaded cavity aperture are configured to accept the threaded base stud, and wherein the solar panel arm support assembly is vertically adjusted, relative to the threaded base stud, by rotating the threaded cavity aperture of the support body around the threaded base stud;
    a base plate comprising a plate, a surface fastener aperture for accepting a surface fastener, and a threaded base stud aperture, wherein the surface fastener aperture is configured to tighten the base plate to an installation surface when a surface fastener is inserted into the surface fastener aperture and into the installation surface;
    a clamp assembly for clamping a solar panel module, the clamp assembly including a clamp slot; and
    a clamping fastener configured to be inserted through the clamp slot and the arm slot and to be adjustably tightened therein to secure the clamp assembly to the solar panel arm support assembly, wherein the arm slot and clamp slot are configured to allow the clamp assembly to be adjusted in all dimensions on a plane relative to the solar panel arm support assembly.

2. The solar panel mounting assembly of claim 1, wherein the arm slot is proximate to a terminal end of the mounting arm.

3. The solar panel mounting assembly of claim 1, wherein the arm slot comprises a linear slot along a length of the mounting arm.

4. The solar panel mounting assembly of claim 3, wherein the clamp assembly includes a bottom clamp with a bottom clamp slot and a top clamp with a top clamp slot which, when compressed together, secure a solar panel module in position, wherein the clamping fastener further comprises a threaded fastener and a nut, and wherein the top clamp is compressed onto the bottom clamp when the clamping fastener is inserted through the top clamp slot and the bottom clamp slot and the nut is tightened on the clamping fastener.

5. The solar panel mounting assembly of claim 4, wherein the bottom clamp slot and the top clamp slot comprise linear slots.

6. The solar panel mounting assembly of claim 4, wherein the clamp assembly can be adjusted around the clamping faster along the arm slot and the clamp slot before the clamping fastener is tightened with the nut.

7. The solar panel mounting assembly of claim 1, wherein the top aperture has a clearance for accommodating a flanged end of the threaded base stud and a socket tool for tightening the threaded base stud onto a base plate.

8. The solar panel mounting assembly of claim 1, wherein the threaded cavity aperture has a clearance for resisting a flanged end of the threaded base stud.

9. The solar panel mounting assembly of claim 1, wherein the threaded base stud aperture is configured at an angle away from a direction orthogonal to the installation surface.

10. A solar panel mounting assembly comprising:
   a solar panel arm support assembly comprising:
      a support body comprising a top aperture on a top of the support body, a vertical cavity, and a threaded cavity aperture;
      a mounting arm substantially orthogonal to the support body, the mounting arm including an arm slot;
      a threaded base stud; and
      wherein the mounting arm extends from the top of the support body and substantially orthogonal to the support body, wherein the top aperture, the vertical cavity and the threaded cavity aperture are configured to accept the threaded base stud, and wherein the solar panel arm support assembly is vertically adjusted, relative to the threaded base stud, by rotating the threaded cavity aperture of the support body around the threaded base stud;
   a clamp assembly for clamping a solar panel module, the clamp assembly including a clamp slot; and
   a clamping fastener configured to be inserted through the clamp slot and the arm slot and to be adjustably tightened therein to secure the clamp assembly to the solar panel arm support assembly, wherein the arm slot and clamp slot are configured to allow the clamp assembly to be adjusted in all dimensions on a plane relative to the solar panel arm support assembly.

11. The solar panel mounting assembly of claim 10, wherein the arm slot is proximate to a terminal end of the mounting arm.

12. The solar panel mounting assembly of claim 10, wherein the arm slot comprises a linear slot along a length of the mounting arm.

13. The solar panel mounting assembly of claim 10, wherein the clamp assembly includes a bottom clamp with a bottom clamp slot and a top clamp with a top clamp slot which, when compressed together, secure a solar panel module in position, wherein the clamping fastener further comprises a threaded fastener and a nut, and wherein the top clamp is compressed onto the bottom clamp when the clamping fastener is inserted through the top clamp slot and the bottom clamp slot and the nut is tightened on the clamping fastener.

14. The solar panel mounting assembly of claim 13, wherein the bottom clamp slot and the top clamp slot comprise linear slots.

15. The solar panel mounting assembly of claim 13, wherein the clamp assembly can be adjusted around the clamping faster and along the length of the arm slot and the clamp slot before the clamping fastener is tightened with the nut.

16. The solar panel mounting assembly of claim 10, wherein the top aperture has a clearance for accommodating a flanged end of the threaded base stud and a socket tool for tightening the threaded base stud onto a base plate.

17. The solar panel mounting assembly of claim 10, wherein the threaded cavity aperture has a clearance for resisting a flanged end of the threaded base stud.

* * * * *